No. 610,054. Patented Aug. 30, 1898.
F. J. HOEFLE.
HANDLE FOR CASKETS.
(Application filed Oct. 15, 1897.)

(No Model.) 2 Sheets—Sheet 1.

WITNESSES

INVENTOR
Francis J. Hoefle
BY
Seymour & Harmon
ATTORNEYS

No. 610,054. Patented Aug. 30, 1898.
F. J. HOEFLE.
HANDLE FOR CASKETS.
(Application filed Oct. 15, 1897.)
(No Model.) 2 Sheets—Sheet 2.

WITNESSES:
Frank S. Ober.
Edward S. Williams

INVENTOR
Francis J. Hoefle
BY
Seymour & Harris
ATTORNEYS.

UNITED STATES PATENT OFFICE.

FRANCIS J. HOEFLE, OF CINCINNATI, OHIO, ASSIGNOR TO THE CINCINNATI COFFIN COMPANY, OF SAME PLACE.

HANDLE FOR CASKETS.

SPECIFICATION forming part of Letters Patent No. 610,054, dated August 30, 1898.

Application filed October 15, 1897. Serial No. 655,299. (No model.)

*To all whom it may concern:*

Be it known that I, FRANCIS J. HOEFLE, a citizen of the United States, and a resident of Cincinnati, in the county of Hamilton and State of Ohio, have invented certain new and useful Improvements in Handles for Caskets, of which the following is a specification.

The object of my invention is to produce a handle for caskets which shall be attractive in appearance and in which no unsightly orifices are visible when the handle is lowered or raised, and also to provide a handle of maximum strength.

Figure 1:
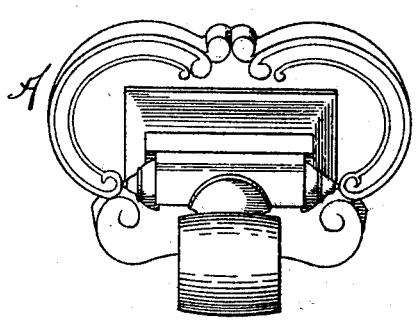
Figure 2:
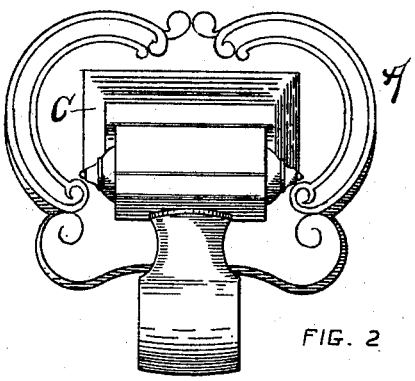
Figure 3:
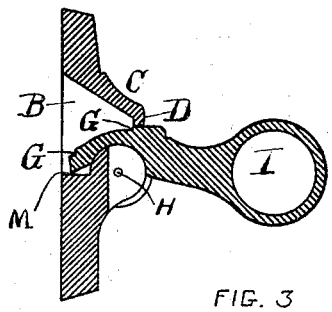
Figure 4:
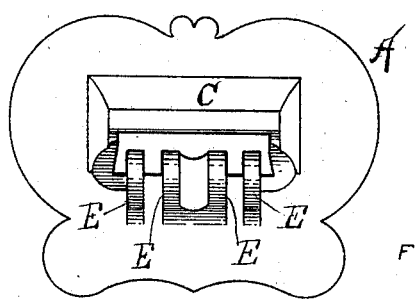
Figure 5:
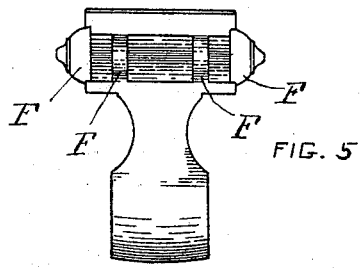
Figure 6:
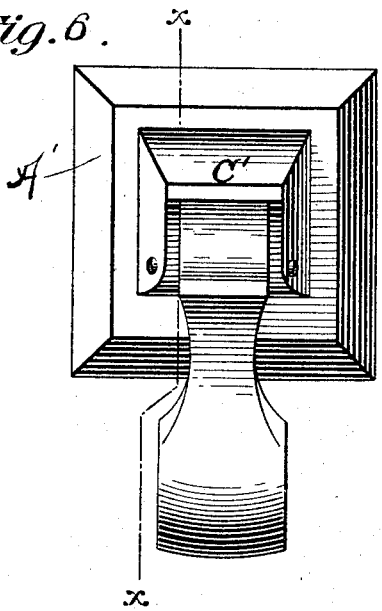
Figure 7:
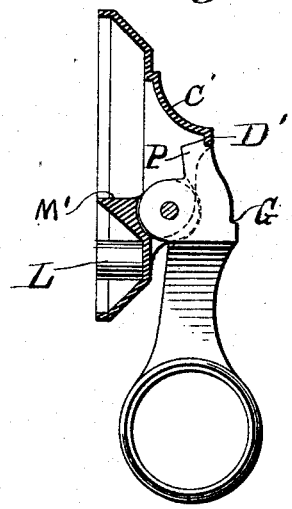
Figure 8:
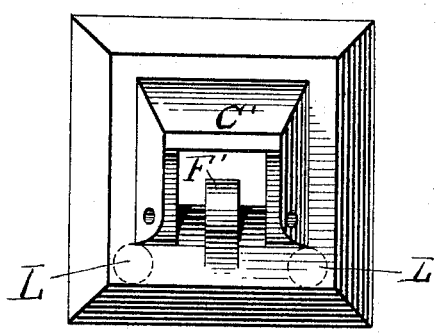
Figure 9:
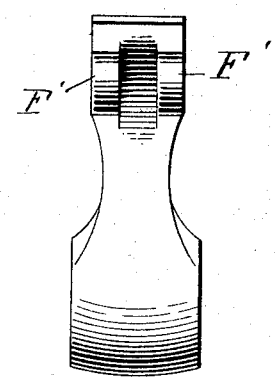

In the terms forming a part of this application, Figure 1 is a perspective view showing the handle in raised position. Fig. 2 is a front elevation showing the handle in a lowered position. Fig. 3 is a central cross-section. Fig. 4 is an elevation of the base-plate with the handle detached. Fig. 5 is a rear elevation of the handle proper. Fig. 6 is a front elevation of a modification of my device. Fig. 7 is a cross-section taken on the line x x of Fig. 6. Fig. 8 is a front elevation with the handle-piece removed. Fig. 9 is a rear elevation of said handle-piece.

The base-plate A, which is attached to the casket, is made of any desired configuration or shape. It is provided with an orifice B. Around three sides of this orifice is a raised rim C, provided with a lip D. Below the orifice are the lugs E, which form one part of the hinge-joint.

The handle-piece is best shown in Figs. 3 and 5. The lower part thereof has an orifice I, through which the rod passes. The handle-piece has on its inner side lugs F, as clearly shown in Fig. 5, these lugs forming the other part of the hinge-joint. The joint is made complete with the pin H passing through the lugs E and F. The outer lugs of the handle-piece are preferably made ornamental in shape, as shown in Fig. 5. The face of this handle-piece is provided with grooves or rabbets G G, as clearly shown in Fig. 3, which gives to the face of the handle-piece the shape shown in the cross-section. The pivot being placed off the center, as shown, when the handle-bar is down the orifice in the base-plate is completely closed and has the appearance of a solid handle-bar. No unsightly orifices are visible and there is nothing to detract from the appearance of the handle. The same is true of the handle in raised position, as is clearly shown in Fig. 1. When the handle is in raised position, it will be observed that a double bearing is formed, one piece of the handle bearing against the end of the lip D and another against the ledge M at the bottom of the orifices in the base-plate. These bearing-surfaces extend the full width of the handle-piece, and thus additional strength is given and the strain on the handle more evenly distributed. The construction of the handle-piece with the lugs F is also an additional feature of strength.

In Figs. 6, 7, 8, and 9 is shown a modification of my device. In this case the base-plate, instead of being solid, as shown in the preceding figures, is made hollow, as clearly shown in Fig. 7, but has the same characteristics of construction noted in the description of the preceding figures, the relative parts being marked with the appropriate letters, as shown. To add strength to this base-plate, bosses L are formed thereon, which are intended to receive the fastening-screws. The handle-piece, instead of having double lugs, is provided with the arrangement clearly shown in Fig. 9, so that the joint is single instead of double. The same advantages are gained from this form as from the other. When the handle-bar is raised, the nose P rests upon the ledge-base M' of the base-plate and the face of the handle-piece bears against the lip D' of the base-piece. Further particular description of this modification is unnecessary.

I claim that by my arrangement and construction not only is beauty and attractiveness attained, but also a handle which is exceedingly strong and in which the strain is distributed to the best effect.

What I claim, and desire to secure by Letters Patent, is—

1. In a handle for caskets, the combination of a base-piece having an orifice therein, a raised rim surrounding said orifice, said rim being provided with lip D, the bottom of the orifice forming a ledge M, a handle-piece pivoted in said orifice closing and concealing the same in both raised and lowered positions, said handle-piece in its raised position bearing against the end of the lip D and the ledge M.

2. In a handle for caskets the combination of the base-piece having an orifice therein and raised rim around the sides of said orifice, a handle pivoted in said orifice, the upper end of said handle-piece having a rabbet which fits the edge of said rim whereby the said orifice is closed and concealed in the lowered position of the handle.

3. In a handle for coffins, the combination of a base-plate having an orifice therein, a raised rim around the sides of said orifice, a handle pivoted in said orifice the upper end of said handle-piece having a rabbet which fits the edge of said rim when the handle is lowered, the handle-piece when raised bearing against the under surface of the under edge of the rim only, and not against its face whereby the orifice is closed and concealed in both the raised and lowered positions of the handle and abrasion or disfiguring of the surface of the plate is prevented, substantially as described.

Signed at Cincinnati, in the county of Hamilton and State of Ohio, this 11th day of October, A. D. 1897.

FRANCIS J. HOEFLE.

Witnesses:
E. M. HARMON,
A. R. BETTS.